United States Patent [19]
Moy

[11] Patent Number: 5,425,102
[45] Date of Patent: Jun. 13, 1995

[54] COMPUTER SECURITY APPARATUS WITH PASSWORD HINTS

[75] Inventor: Michael E. Moy, Lafayette, Colo.

[73] Assignee: Datasonix Corporation, Boulder, Colo.

[21] Appl. No.: 257,679

[22] Filed: Jun. 9, 1994

[51] Int. Cl.[6] .............................................. H04L 9/32
[52] U.S. Cl. ......................................... 380/25; 380/4
[58] Field of Search ...................................... 380/4, 25

[56] References Cited

U.S. PATENT DOCUMENTS

| | | | |
|---|---|---|---|
| 4,964,163 | 10/1990 | Berry | 380/25 X |
| 5,091,939 | 2/1992 | Cole et al. | 380/25 |
| 5,163,097 | 11/1992 | Pegg | 380/25 X |
| 5,311,594 | 5/1994 | Penzias | 380/25 X |
| 5,345,549 | 9/1994 | Appel et al. | 380/4 X |

Primary Examiner—Gilberto Barrón, Jr.
Attorney, Agent, or Firm—Duft, Graziano & Forest

[57] ABSTRACT

The computer security apparatus is appended to existing computer data file protection apparatus and operates as an adjunct thereto. The user invokes the password and/or data file encryption processes in the usual manner. If the user cannot remember the password used, the computer security apparatus presents a prerecorded password hint to the user in an attempt to jog the user's memory to recall the password. If the initial password hint does not accomplish this goal, a succession of additional, more specific password hints, can be provided to ultimately induce the user to recall the password.

14 Claims, 3 Drawing Sheets

COMPUTER SECURITY APPARATUS WITH PASSWORD HINTS

FIELD OF THE INVENTION

This invention relates to computer systems and in particular to a computer security apparatus that makes it more convenient for a user to use password protection for files and to encrypt files.

PROBLEM

It is a problem in computer systems to provide adequate security for data files that are stored on a computer system, especially multi-user computer systems. Computer systems include well known security capabilities, such as password protection of data files and encryption of data files. These capabilities are little used because the users either find such capabilities burdensome or are intimidated by the finality of such security.

Password protection of computer files is implemented on a computer system either as an entre to accessing the system via the keyboard and/or on an individual data file basis. The computer system typically provides the user with a prompt when the user attempts to access the protected data files. The user must then provide the password to the password security apparatus which unlocks the data file access prevention software resident on the computer system if the password entered matches an originally provided password. Once the password procedure is completed, the user has unfettered access to the protected data file. The password is provided to the computer system by the user when the data file is created or the password security capability is initially invoked. The user must thereafter enter a password that exactly matches the password initially input by the user.

Encryption is an additional security capability provided on computer systems that renders data files undecipherable, even if the password security protection is thwarted. The encryption process algorithmically scrambles the contents of a data file, based on a password that is provided by the user. There are many encryption systems, of varying complexity of scrambling. The encrypted data file is unscrambled by the user providing the encryption/decryption process with the descrambling key. This descrambling key is input to the decryption algorithm to recreate the data file from the scrambled version thereof. The keys that are used in this process can be "private" in that only the user can decrypt the scrambled data file, or can make use of a "public" or "shared" key system where another user, having an appropriate decryption key can recreate the encrypted data file.

The difficulty with password protection of data files is that users frequently forget the password. For password protected data files, the data file is stored in clear text form and can be retrieved by a system administrator who is identified as a "super user" on the computer system. With encrypted data files, the encrypted data file is irretrievably lost if the user cannot produce the decryption key. The users typically avoid the loss of the password by writing the password in a memorable place, such as a desk calendar, or give the password to a coworker to enable the user to locate the password if the user forgets the password. The disclosure of a password to another person, or writing the password in a discoverable location, thwarts the security capability. Therefore, the password system is infrequently used in computer systems, and when used is often compromised by the user failing to rigorously follow the defined security procedure. Thus, data file protection is little used in computer systems and the term computer security is an oxymoron. The need for data file security, especially encryption, has become more critical, especially with the increased use of shared data file systems and the transmission of data via public networks.

SOLUTION

The above described problems are solved and a technical advance achieved in the field by the computer security apparatus of the present invention which simplifies the administration of passwords by providing the user with password "hints" if the user fails to recall the password. This apparatus is appended to existing computer security apparatus and operates as an adjunct thereto. The user invokes the password and/or data file encryption processes (hereinafter collectively referred to as password protection system) in the usual manner. When the used thereafter attempts to access the protected data files via the password protection system and cannot remember the password used, the computer security apparatus of the present invention inquires whether the user wishes to receive a password hint from the apparatus. The user can then request a password hint, which was provided to the system by the user upon the password protection initially being invoked. The computer security apparatus then presents the prerecorded password hint to the user in an attempt to jog the user's memory to recall the password. If the initial password hint does not accomplish this goal, a succession of additional, and typically more specific password hints, can be provided to the user to ultimately induce the user to recall the password.

In this manner, the computer security apparatus of the present invention reduces the likelihood that a user cannot recall the password and looses access to the protected data file. This capability enables the user to use password protection without the fear that the password will not be recalled. This apparatus also has the benefit of encouraging the user to select obscure items as the password, since anyone who accesses the computer system can receive the password hints. The use of obscure items as passwords increases security, since many users select simple passwords, such as the name of a family member, a birthdate, address, social security number, or other such easily discovered information.

DETAILED DESCRIPTION

Computer systems include well known security capabilities, such as password protection of data files and encryption of data files. These capabilities are little used because the users either find such capabilities burdensome or are intimidated by the finality of such security.

Figure 1:
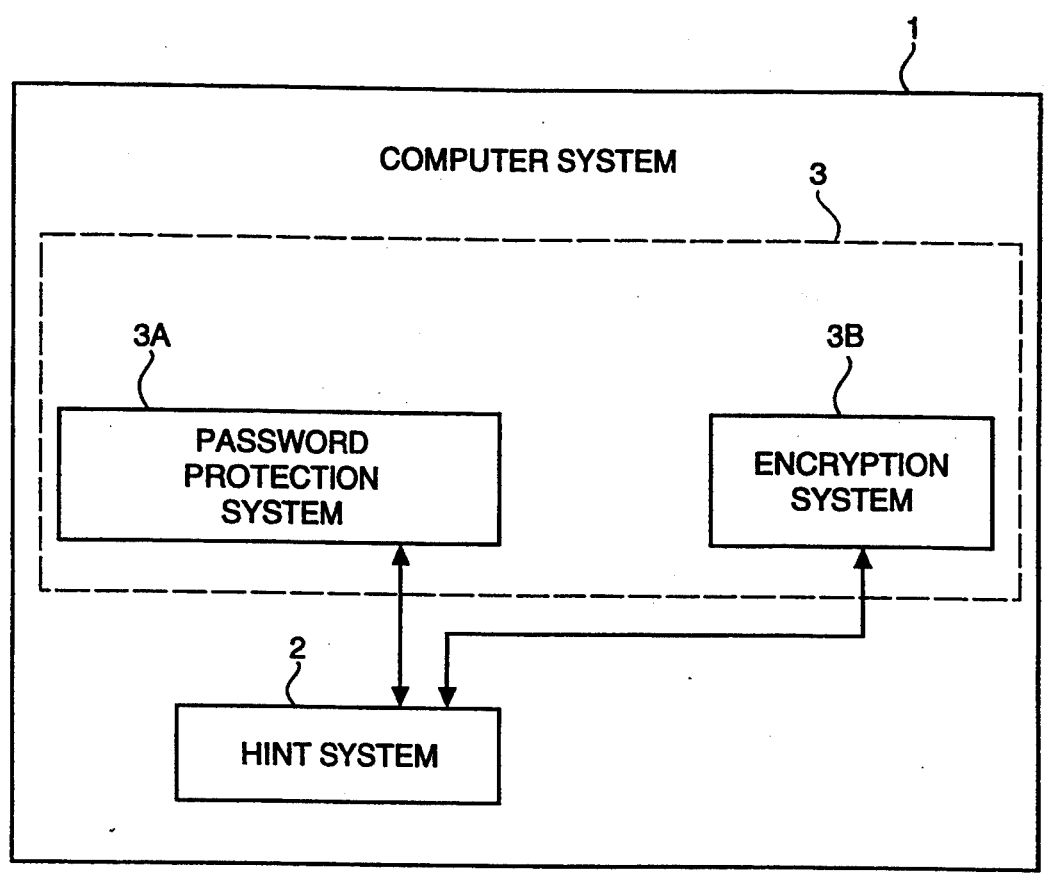
FIG. 1 illustrates in block diagram form the overall architecture of the computer security apparatus of the present invention as well as the password protection apparatus typically found in existing computer systems.

FIG. 1 illustrates in block diagram form the conceptual architecture of a typical security apparatus 3 that is resident in a computer system 1, and the inclusion of the computer security apparatus 2 of the present invention. The computer system 1 includes a user password identification system 3A and a data file encryption/decryption system 3B that are available to prevent unauthorized access to the protected data files.

Password protection of computer files is implemented on computer system 1 either as an entre to accessing the computer system 1 via the keyboard, and/or on an individual data file basis, and/or to block certain users from executing certain parts of application programs. The computer system 1 activates the password identification system 3A when the user attempts to access the protected data files, or upon activation of the terminal of computer system 1. The password identification system 3A typically provides the user with a prompt such as that illustrated in FIG. 3. The user must then enter the password that matches the password stored in password identification system 3A, in order to have the password identification system 3A unlock the data file access prevention software resident on computer system 1. Once the password procedure is completed, the user has unfettered access to the protected data file. The password is provided to the computer system 1 by the user when the data file is created or the password security system 3A is initially invoked to protect the data file. The user must thereafter enter a password that exactly matches the password initially input by the user to obtain access to the protected data file.

Encryption is an additional security capability provided on computer system 1 that renders data files undecipherable, even if the password security protection is thwarted. The encryption/decryption system 3B algorithmically scrambles the contents of a selected data file, based on a password that is provided by the user. There are many encryption systems, of varying complexity of scrambling. The encrypted data file is unscrambled by the user providing the encryption/decryption system 3B with the descrambling key. This descrambling key is input to the decryption algorithm to recreate the data file from the scrambled version thereof. The keys that are used in this process can be "private" in that only the user can decrypt the scrambled data file, or can make use of a "public" or "shared" key system where another user, having an appropriate decryption key can recreate the encrypted data file.

The computer security apparatus of the present invention, hereinafter termed hint system 2, is appended to the existing computer security apparatus 3 and operates as an adjunct thereto. The user invokes the password and/or data file encryption processes in the usual manner. When the user thereafter attempts to access the protected data files via the password protection system 3A, for example, and cannot remember the password used, the password identification system 3A invokes the hint system 2 in response to the user selecting the "Hint" menu choice on the display shown in FIG. 3. The hint system 2 then presents the prerecorded password hint to the user in a manner such as that illustrated by the display presented in FIG. 4 in an attempt to jog the user's memory to recall the password. If the initial password hint does not accomplish this goal, a succession of additional, and typically more specific password hints, can be provided to the user to ultimately induce the user to recall the password.

Operation of Computer Security Apparatus

Figure 2:
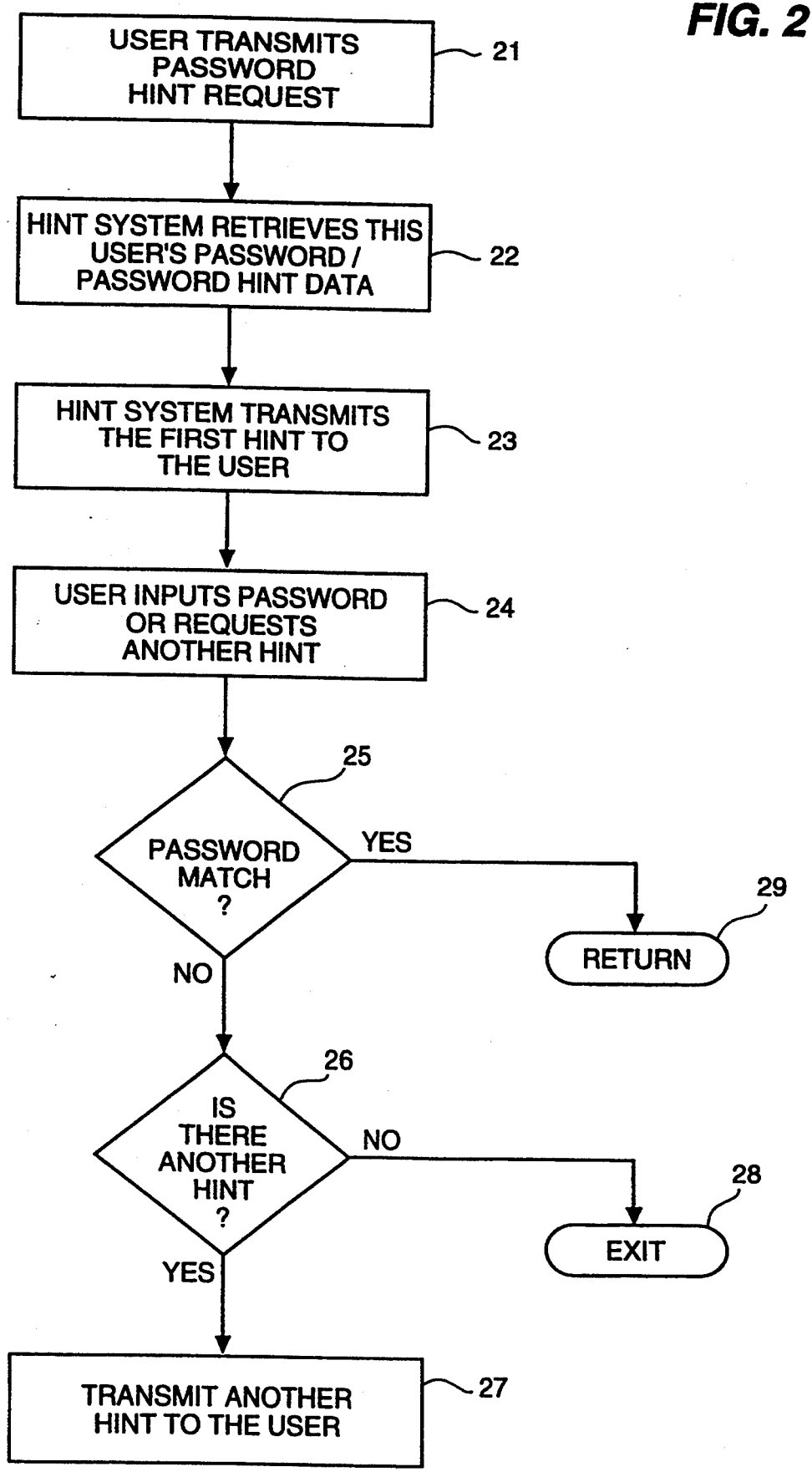
FIG. 2 illustrates in flow diagram form the operation of the computer security apparatus of the present invention.
Figure 3:
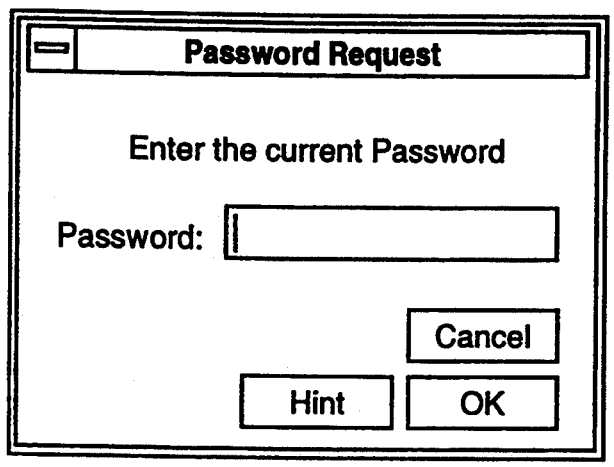
FIGS. 3 and 4 illustrate typical displays presented to a user as part of the operation of the computer security apparatus of the present invention.
Figure 4:
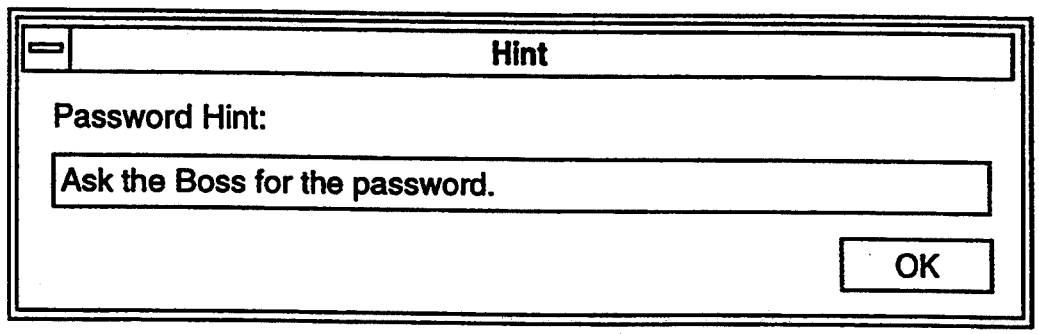

The hint system 2 operates to provide the user with a password hint as illustrated in flow diagram form in FIG. 2. The process is initiated at step 21 by a one of password identification system 3A or encryption/decryption system 3B transmitting a password hint request to hint system 2. This process is initiated in one of password identification system 3A or encryption/decryption system 3B by the user electing to activate the hint system 2 pursuant to a menu choice "Hint" as illustrated in FIG. 3. The request received by hint system 2 identifies the user so that the hint system can identify the proper set of hints to be presented to the user. The user identification is obtained either by identifying the terminal device from which the data file access request has originated or by the user entering a user identification as part of the standard login process.

Hint system 2 maintains in memory a set of password (or user ID)-password hint sequences for each user of computer system I who has initiated a password protection system data file protection sequence. The password data can be encoded, scrambled or dispersed in the storage medium, and the password hints can be similarly managed. Upon receipt of the password hint request at step 21, the hint system 2 uses the user identification to retrieve the password-password hint data from memory at step 22. Hint system 2 at step 23 transmits the first of the sequence of hints in this retrieved data to the user via a display such as that illustrated in FIG. 4. The user reads the hint and then can activate the "OK" legend on the menu display to return to the password sequence of the requesting process. Alternatively, the hint system 2 assumes complete control over the password process and provides a password entry screen such as that illustrated in FIG. 3 or provides a display which combines the hint screen of FIG. 4 with a password entry line such as that used in FIG. 3. In either case, the user inputs a second attempt at a password, which is then reviewed at step 24 by the requesting process or hint system 2. The newly entered password is then compared at step 25 to the stored password, and, at step 26, if the password does not match the stored password, the hint display is automatically retransmitted to the user, or the user is enabled to prompt for another password hint. This process of hint and password retry is iteratively repeated seriatim until the sequence of password hints is exhausted. This determination is made at step 27 where the hint system 2 determines that the entire sequence of password hints has been provided to the user and the user has consistently failed to produce the proper password. At this juncture, processing exits at step 28 and the user is blocked from entry into the protected data file and typically ejected from the system by terminating all responses to the user's terminal. Alternatively, the user enters a proper password and the hint system 2 is deactivated. The proper password selection is determined by hint system 2 or by the requesting process. If the requesting process identifies the correct password, it transmits a control message to the hint system 2 which then terminates the hint process for the identified user.

Hint Selection and Examples

The password hints are provided by the user upon the initial activation of a password protection system resident on computer system 1. The optimal password is a string of alphanumeric characters that cannot be guessed by an unauthorized user or uncovered by a reasonable amount of espionage into the user's background and personal information. Thus, the password itself may not be memorable to the user and the hints should clearly direct the user and no one else to the proper password. In addition, different passwords may be used for different files or classes of data files and the user may not be able to recall which legitimate password is used with the desired class of data files.

The set of hints (if there is more than one hint) should represent a succession of clues from the general to the more specific that guide the user's recollection inexorably to the desired password. For example, if the password is the name: Obajoba, which represents the name given to the user's pet turtle when he was a child, the succession of hints should gradually focus more specifically on the context of the name. Therefore, a likely first hint could be: Childhood friend. A second hint could then be: Reptilian pet. The final hint in the sequence could be: My first turtle's name. This sequence does not provide an unauthorized user with information that reveals the password unless the authorized user has widely disseminated the information about his pet turtle.

In a group setting, there can be a password administrator or a password which enables all members of the group to access common shared data files. Thus, a data file can be created by a first user and access to this data file enabled to a set of other users who are members of the same work group as the first user via the issuance of a limited distribution public access password. All members of the work group have knowledge of the shared password, while outsiders do not have knowledge of the group password and cannot therefore access the created data file. The members of the group may not be aware of the creation of the data file or may not know whether the newly created data file is from a member of their group. The user then attempts to access the data file and receives a hint such as: Data file for systems engineering group, Dept. 324. If the user is a member of Dept. 324, the group password is known and the hint simply indicates to the user that this file is directed to the user and accessible via the group password. Again, if the user cannot remember this group password, further password hints can be provided to stimulate the user's memory. As an administrative rule, the hint should not contain the password itself. Thus, if the password is: "The", the hint should not be of the form to recite the password, such as: "The password is the first word in this sentence". This rule can be automatically enforced by the hint system 2 performing a string match operation of the password and the set of password hints.

Summary

In summary, the computer security apparatus of the present invention reduces the likelihood that a user cannot recall the password and looses access to the protected data file. This capability enables the user to use password protection without the fear that the password will not be recalled. This apparatus also has the benefit of encouraging the user to select obscure items as passwords, since anyone who accesses the computer system can receive the password hints. The use of obscure items as passwords increases security, since many users select simple passwords, such as the name of a family member, a birthdate, address, social security number, or other such easily discovered information.

We claim:

1. A password system for enabling a user to access data files stored on a computer system by providing a predefined password to said computer system, comprising:
   means for storing data indicative of a password assigned to a user;
   means for storing at least one hint that suggests said password to said user; and
   means for displaying said at least one hint to said user.

2. The system of claim 1 wherein said hint storing means comprises:
   means for storing data indicative of the identity of said user; and
   means for storing data indicative of said at least one hint in a manner to associate said user with said at least one hint.

3. The system of claim 2 wherein said at least one hint comprises a succession of hints, said displaying means comprises:
   means, responsive to said user failing to provide said password, for retrieving a first of said succession of hints from said hint storing means; and
   means for transmitting said retrieved first hint to a display device for display to said user.

4. The system of claim 3 wherein said displaying means further comprises:
   means, responsive to said user failing to provide said password upon receipt of a hint, for retrieving a next successive hint from said hint storing means; and
   means for providing said retrieved next successive hint to said transmitting means for transmission to said display device.

5. The system of claim 4 wherein said displaying means further comprises:
   means for successively activating said next successive hint retrieving means in response to said user failing to provide said password in response to a received password until no further hints are stored in said hint storing means for said user.

6. The system of claim 1 further comprising:
   means, responsive to said user providing a password to said computer system, for comparing said provided password with said password stored in said storing means;
   means, responsive to a failure to match said provided and stored passwords for activating said displaying means.

7. The system of claim 1 further comprising:
   means, responsive to said user inputting data into said computer system indicative of a request for password hints, for activating said displaying means.

8. A method of password determination to enable a user to access data files on a computer system by providing a predefined password to said computer system, comprising the steps of:
   storing data indicative of a password assigned to a user;
   storing at least one hint in said memory that suggests said password to said user; and
   displaying said at least one hint to said user.

9. The method of claim 8 wherein said step of hint storing comprises:
   storing data indicative of the identity of said user; and
   storing data indicative of said at least one hint in a manner to associate said user with said at least one hint.

10. The method of claim 9 wherein said at least one hint comprises a succession of hints, said step of displaying comprises:
retrieving, in response to said user failing to provide said password, for retrieving a first of said succession of hints from said memory; and
transmitting said retrieved first hint to a display device for display to said user.

11. The method of claim 10 wherein said step of displaying further comprises:
retrieving, in response to said user failing to provide said password upon receipt of a hint, a next successive hint from said memory; and
activating, using said retrieved next successive hint, said step of transmitting to send said next successive hint to said display device.

12. The method of claim 11 wherein said step of displaying further comprises:
successively activating said step of next successive hint retrieving in response to said user failing to provide said password in response to a received password until no further hints are stored in said memory for said user.

13. The method of claim 8 further comprising the steps of:
comparing, in response to said user providing a password to said computer system, said provided password with said password stored in said memory;
activating, in response to a failure to match said provided and stored passwords, said step of displaying.

14. The method of claim 8 further comprising the step of:
activating, in response to said user inputting data into said computer system indicative of a request for password hints, said step of displaying.

* * * * *